United States Patent
DeGiacomo

(10) Patent No.: US 7,736,496 B2
(45) Date of Patent: Jun. 15, 2010

(54) DUAL PUMP WATER TREATMENT SYSTEM FOR AUTOMATIC TOP OFF

(76) Inventor: George DeGiacomo, 667 Belmont St., Belmont, MA (US) 02478

( * ) Notice: Subject to any disclaimer, the term of this patent is extended or adjusted under 35 U.S.C. 154(b) by 0 days.

(21) Appl. No.: 12/313,949

(22) Filed: Nov. 26, 2008

(65) Prior Publication Data
US 2009/0294378 A1    Dec. 3, 2009

Related U.S. Application Data

(60) Provisional application No. 61/128,996, filed on May 27, 2008.

(51) Int. Cl.
*A01K 63/04*    (2006.01)
(52) U.S. Cl. .................... 210/97; 210/121; 210/167.21; 210/198.1; 210/416.2; 119/268
(58) Field of Classification Search .................... 210/97, 210/121, 123, 167.21, 198.1, 416.1, 416.2; 119/268
See application file for complete search history.

(56) References Cited

U.S. PATENT DOCUMENTS

| | | | |
|---|---|---|---|
| 3,705,598 A | 12/1972 | Ray | 137/101.25 |
| 3,888,210 A * | 6/1975 | Buss | 119/226 |
| 4,043,299 A * | 8/1977 | Birkbeck et al. | 119/227 |
| 4,551,068 A | 11/1985 | Boudreaux | 417/8 |
| 4,652,802 A | 3/1987 | Johnston | 318/482 |
| 5,422,550 A | 6/1995 | McClanahan | 318/91 |
| 5,449,274 A | 9/1995 | Kochan | 417/8 |
| 5,503,533 A | 4/1996 | Potter | 417/63 |
| 5,909,352 A | 6/1999 | Klabunde | 361/191 |
| 6,003,164 A | 12/1999 | Leaders | 4/507 |
| 6,186,743 B1 | 2/2001 | Romer | 417/3 |
| 6,203,280 B1 | 3/2001 | Van Zyl | 417/36 |
| 7,222,047 B2 * | 5/2007 | McMillan et al. | 702/182 |
| 7,604,734 B2 * | 10/2009 | Smith | 210/167.22 |
| 2005/0109697 A1* | 5/2005 | Olivier | 210/610 |
| 2005/0133423 A1* | 6/2005 | Olivier | 210/169 |
| 2007/0135799 A1 | 6/2007 | Hood | 604/892.1 |

FOREIGN PATENT DOCUMENTS

| | | |
|---|---|---|
| JP | 63055385 | 3/1988 |
| JP | 2055885 | 2/1990 |
| JP | 20060226688 A | 1/2006 |
| JP | 2006336560 A | 12/2006 |
| WO | WO9001263 A1 | 2/1990 |

* cited by examiner

*Primary Examiner*—Fred Prince
(74) *Attorney, Agent, or Firm*—Law Office of J.D. Geraigery; Janine D. Geraigery

(57) ABSTRACT

A dual pump water treatment system for automatically replenishing the water level within a tank of a marine reef aquarium by alternating between a calcium solution reservoir and an alkalinity solution reservoir. The calcium reservoir is in connection with a first pump, while the alkalinity reservoir is in connection with a second pump. The system includes a pair of water level sensors in communication with a solid state relay on a printed circuit board of a switch box. When the water level drops the sensor triggers the relay to turn on the calcium reservoir. When the water level is replenished the first pump is turned off. When the water level drops again, the sensor triggers the relay to turn on the alkalinity reservoir. When the water level is replenished the second pump is turned off. The cycle is repeated based on water level in the tank.

10 Claims, 4 Drawing Sheets

DUAL PUMP WATER TREATMENT SYSTEM FOR AUTOMATIC TOP OFF

CROSS-REFERENCE TO RELATED APPLICATION

This application claims the benefit of provisional patent application Ser. No. 61/128,996, filed in the United States Patent Office on May 27, 2008.

BACKGROUND OF THE INVENTION

1. Field of the Invention

The invention relates to water treatment systems, and more particularly, to a water treatment system equipped with dual pumps for automatically replenishing the water level within a marine reef aquarium by alternating between two treatment reservoirs. To sustain the water level of the marine reef aquarium, dual pumps alternate to replenish the water level in the tank from a fresh water reservoir treated with a calcium solution and a fresh water reservoir treated with an alkalinity solution.

Marine aquariums containing reefs can be especially challenging due to the reef tank chemistry involved. Various supplements are required in order to grow stony corals and clams in reef aquariums. Calcium additives and alkalinity buffers are especially important for stony corals in building their skeletons and shells. However, the two supplements cannot be mixed together and simultaneously added to the tank because the calcium will precipitate out of the solution. Currently, two common methods of delivering the supplement are available. The first includes manual dosing by adding equal amounts of the calcium supplement and alkalinity supplement once a day. The second is automatic dosing by two peristaltic pumps continuously dripping each supplement into the tank.

Another challenge of marine reef aquariums is maintaining the tank's fresh water level. Due to the high evaporation rate within the tank, fresh water must be added daily in order to maintain constant salinity. An automatic top off device is commonly used to pump fresh water back into the tank when the water level drops.

However, the cost of maintaining a marine reef aquarium that incorporates the methods currently available on the market is daunting. Under the current method, three pumps are required; one inexpensive pump for the automatic top off and two expensive pumps for the calcium and alkalinity additives. The invention seeks to eliminate the foregoing dilemmas by delivering alternate doses of calcium and alkalinity through two inexpensive pumps equipped with an automatic top off water level controller.

2. Description of the Related Art

U.S. Pat. No. 3,705,598 to Ray discloses a demand responsive system for automatically mixing and replenishing liquid chemicals subject to degradation when mixed, including collapsible storage vessels for the unmixed chemicals, a small reservoir for storing and mixing chemicals, pump means to transfer chemicals from the separate storage vessels to the reservoir at rates higher than the demand rates, valve means within the reservoir for maintaining the reservoir level within selected limits, and means for connecting the reservoir with a chemical user. For photographic film processors, for example, the system functions on demand to periodically replenish a mixture of A and B type working solutions, while also supplying fixer and water if desired. This system supplies adequate amounts of the mixture on demand with a minimum of deterioration by premixing only an amount which may be needed for immediate use. The system is completely automatic and needs no operator control.

U.S. Pat. No. 4,551,068 to Boudreaux discloses a 100% solid state, liquid level control circuit which utilizes printed board construction with integrated circuits to control duplex pumps. Mercury switches provide information to the solid state, non-inductive input interface circuitry which relays this information to logic control circuitry and an alternator. The logic control circuitry and an alternator forward the information to solid state, non-inductive output circuitry for powering pump starters. The alternator selectively alternates the sequencing of the pumps for controlling the lead pump. Current limiting devices, light emitting diodes and logic control circuitry are combined to provide operation of pump starters for controlling the liquid level in a wet well, reservoir, bilge of a vessel, or the like.

U.S. Pat. No. 4,652,802 to Johnston discloses an alternator circuit arrangement for controlling the electrical energization of multiple load devices such as two pump motors on an alternating basis so as to maintain the level of a liquid in a container within a predetermined range. The alternator circuit arrangement further including an RC circuit having a capacitor for discharging through a normally closed switch which is opened during energization of the pump motors so as to energize a bi-stable relay which in turn interconnects alternate ones of the pump motors to the alternator circuit such that upon detection of the liquid at an intermediate level alternate ones of the pumps are energized.

U.S. Pat. No. 5,422,550 to McClanahan et al. discloses a control system and method for a plurality of motors that utilizes one, and only one, motor drive unit that provides power to drive any one of the motors. The system and method also utilize a controller that controls which of the motors to energize. Power from the motor drive unit can be communicated to one of the motors selected by the controller, or power from a primary power source can be communicated to one or more of the motors selected by the controller. Sequencing of the motors to and from the motor drive unit and the primary power source, and between the two, is automatically controlled, such as based on how long each of the motors has been used. Accordingly, a method of controlling a plurality of motors comprises: defining a motor utilization criterion; sensing a parameter affected by the number of the motors that are operating; and sequentially starting and cumulatively operating ones of the motors selected in response to the motor utilization criterion and the sensed parameter.

U.S. Pat. No. 5,449,274 to Kochan discloses an electronic pump selector system that uses a programmable processor to select one of a plurality of pumps to be energized in response to an appropriate feedback signal from the selected pump. A current limited feedback circuit is incorporated which provides a varying voltage in response to a level switch associated with a selected pump indicating a high fluid level. In response to the voltage feedback signal, the selected pump is energized for a predetermined period of time. Subsequently, another pump is selected. The next selected pump is energized also for a predetermined period of time in response to a varying voltage feedback signal therefrom. The next pump is then selected and the sequence continued.

U.S. Pat. No. 5,503,533 to Potter et al. discloses a multiple pump, multiple tank fluid control system that incorporates a programmable processor which communicates with an operator input/output control panel which can be switched between each member of the plurality of tanks. Pump on and off levels for a selected tank can be readily set electronically using control switches on the control panel. On and off levels for different pumps can be nested readily by the operator to provide multiple pump capacity as deemed desirable by the operator.

U.S. Pat. No. 5,909,352 to Klabunde et al. discloses an alternator circuit for alternately operating one of first and second electrical load devices which uses a magnetic latch relay to perform the alternation. The circuit includes a first circuit means for supplying electrical energy from a source to one of said first and second electrical load devices, and magnetic latch relay alternating means having first and second states. The alternating means in a first state interconnects the first electrical load device to the first circuit means, and in the second state interconnects the second electrical load device to the first circuit means. One application of the inventive circuit is for use in controlling the level of liquid in a container within a predetermined range using 2 pumps.

U.S. Pat. No. 6,003,164 to Leaders discloses a pool monitoring and control system, including a pool having a plurality of inputs and a plurality outputs. Also included is a pump for suctioning fluid from the outputs of the pool only during the activation thereof. A control assembly is connected between the pump and the pool. The control assembly includes at least one sensor adapted to generate an activation signal upon a parameter of the pool falling out of a predetermined range. Further, at least one dispenser is included for dispensing a parameter correction fluid upon the actuation thereof. In use, the control assembly, when the pump is activated, is adapted to actuate the dispenser if the activation signal is received.

U.S. Pat. No. 6,186,743 to Romer discloses a sequential controller for sequencing multiple electric loads such electric pumps. That is, for each cycle the next load is designated as the lead load in a round-robin fashion. The controller uses cost effective electro-mechanical relay logic an thus avoids conventional solid state technology. In order to sequence the loads on each successive cycle, the electro-mechanical relay connected to the sensors comprises a double-throw contact set. The double-throw contact set comprises two complementary contacts, both of which alternate between normally open and normally closed on each successive cycle. In this manner one each successive cycle, the pumps designated as the lead pump and the lag pump automatically alternate in a round-robin fashion. Further, when the lead pump is disabled the lag pump is immediately actuated without disruption of service.

U.S. Pat. No. 6,203,280 to Van Zyl discloses a method for totalizing the volume of liquid pumped to or from a vessel by a set of pumps. The method comprises the following steps: Calculating a running time for each of the pumps. Determining a first rate of change of volume when each of the pumps is turned on and a second rate of change a predetermined period after each of the pumps is turned on. Determining a draw down rate for each of the pumps and calculating the volume pumped by each pump based on the running time and draw down rate. Summing the volume pumped by each of the pumps to give a total volume pumped for the vessel over the operating time for the pumps. The totalizing method is incorporated with a control system for controlling the pumping of liquid to or from a vessel using one or more pumps. The control system comprises a level sensor, an actuator for each of the pumps, and a controller. The controller is programmed to issue control signals to the actuators and execute process steps for totalizing the volume of liquid pumped in the vessel.

United States Pat. Appl. No. 2007/0135799 to Hood et al. discloses embodiments of a system including a remotely controlled osmotic pump device and associated controller. Methods of use and control of the device are also disclosed. According to some embodiments, an osmotic pump device is placed in an environment in order to pump a material into the environment or into an additional fluid handling structure within the osmotic pump device. Exemplary environments include a body of an organism, a body of water, or an enclosed volume of a fluid. In selected embodiments, a magnetic field, an electric field, or electromagnetic control signal may be used.

Worldwide Pat. No. 1990/001263 to Adey discloses a water purification system that creates an integrated, small-scale marine or fresh water ecosystem that is particularly useful as a home, school, office, or laboratory aquarium. In operation, water from the aquarium tank is routed to an algal turf scrubber screen or equivalent algal-growing surface placed in a movable, substantially flat, horizontally positioned, tray-shaped receptacle. An algal turf, comprising preferably a dense colony of microalgae, resides on the screen. As the receptacle fills with water, the center of gravity of the receptacle moves across the axis of the pivots upon which the receptacle is mounted. At this time, the substantially filled receptacle rotates on its pivots and the desired surge effect across the scrubber by the exiting water is achieved. The surge, light energy provided by lights above the receptacle, and algal photosynthesis promote metabolic cellular-ambient water exchange to remove carbon dioxide and other pollutants.

Japan Patent No. 2055885 to Matsushita Electric Works Ltd. discloses a pump controller with an automatic selector means 22 operating two pumps alternately in response to a control signal, and a forced selector means 27 operating an inoperative side pump forcedly in response to an abnormal level detection signal. When this abnormal level detection signal is once inputted, a latch circuit 23 latches the abnormal level detection signal till it is reset by the control signal. Therefore a forced operating state of one pump by the forced selector means 27 is maintainable, so that even if the abnormal level detection signal causes any chattering, the two pumps are in no case subjected to transfer operation.

Japan Patent Appl. No. 2006/336560 to Tanaka et al. discloses two submerged pumps including the No. 1 pump P1 and the No. 2 pump P2 alternately and automatically operated and controlled. These submerged pumps have a second float switch S2 for detecting a start water level H2 and a stop water level L2 of the No. 2 pump P2. These submerged pumps have a first float switch S1 for detecting a higher water level than the second float switch and detecting a start water level H1 and a stop water level L1 of the No. 1 pump P1. These submerged pumps have a third float switch S3 for detecting an abnormal water level H3 being a further higher water level than the first float switch. These submerged pumps have an automatic alternate operation controller for controlling alternate operation by switching operation mode and operation halt mode of the No. 2 pump P2.

Japan Patent Appl. No. 2006/0226688 to Itani discloses Two submerged pumps 1 installed in a reservoir tank 21 of a submerged pump device 20. A water level sensor of each submerged pump 1 consists of an individual electrostatic capacitor sensor 10. A control circuit of each submerged pump 1 is provided with multiple kinds of timer circuits having different start set times for starting the submerged pump 1 when the electrostatic capacity sensor 10 detects water level continuously for predetermined period of time. The submerged pump is controlled to alternately select start set time from multiple kinds of timer circuits and start when the electrostatic capacity sensor 10 detects water level, and to stop after predetermined time passes when the water level sensor 1 does not detect water level.

Japan Patent Appl. No. 63055385 to Kosaka discloses a device such that when an external signal causes a pump drive relay contact y to turn on, a first motor control relay X1 is energized through contacts a1, a2 to drive a first motor for discharging water. When the water has been discharged, the relay contact y turns off to turn off alternate relays A1, A2 so that the contacts a1, a2 are inverted. Next, when an external signal causes the relay contact y to turn on, a second motor control relay X2 is energized to drive a second motor, then when a pump drive signal turns off, contacts of the alternate relays A1, A2 are inverted. With the arrangement, the motors 1-3 are driven sequentially. When a contact a3 is inverted and all of the motor control relays X1-X3 are not energized, a start confirmation timer T1 causes the contacts a1, a3 to be inverted to start alternate operation again.

While these units may be suitable for the particular purpose employed, or for general use, they would not be as suitable for the purposes of the present invention as disclosed hereafter.

SUMMARY OF THE INVENTION

It is an object of the invention to provide an efficient water treatment system that incorporates automatic water level control and automatic supplement dosing in order to balance the levels of fresh water and calcium and alkalinity additives within a marine reef aquarium.

It is another object of the invention to provide a water treatment system that automatically alternates between delivering calcium supplements and alkalinity supplements.

It is another object of the invention to provide a system that is cost-efficient due to the inexpensive automatic top off pumps utilized.

It is another object of the invention to provide a space saving system that eliminates the need for three separate reservoirs for fresh water, calcium additives, and alkalinity additives by containing only two fresh water reservoirs with either calcium or alkalinity supplements added into each.

This invention is a dual pump water treatment system for automatically replenishing the water level within a tank of a marine reef aquarium by alternating between a calcium solution reservoir and an alkalinity solution reservoir. The calcium reservoir is in connection with a first pump, while the alkalinity reservoir is in connection with a second pump. The system includes a pair of water level sensors in communication with a solid state relay on a printed circuit board of a switch box. The water level sensors can be of any type known in the art that will accurately detect the water levels, including but not limited to magnetic and mechanical float level sensors, pneumatic level sensors, conductive or electrode based level sensors, capacitance level sensors, optical interface point level sensors, ultrasonic sensors, microwave or radar level sensors, magnetostrictive level sensors, resistive chain level sensors, hydrostatic pressure level sensors, and air bubbler level measurement systems. When the water level drops the sensor triggers the relay to turn on the calcium reservoir. When the water level is replenished the first pump is turned off. When the water level drops again, the sensor triggers the relay to turn on the alkalinity reservoir. When the water level is replenished the second pump is turned off. The cycle is repeated based on water level in the tank.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
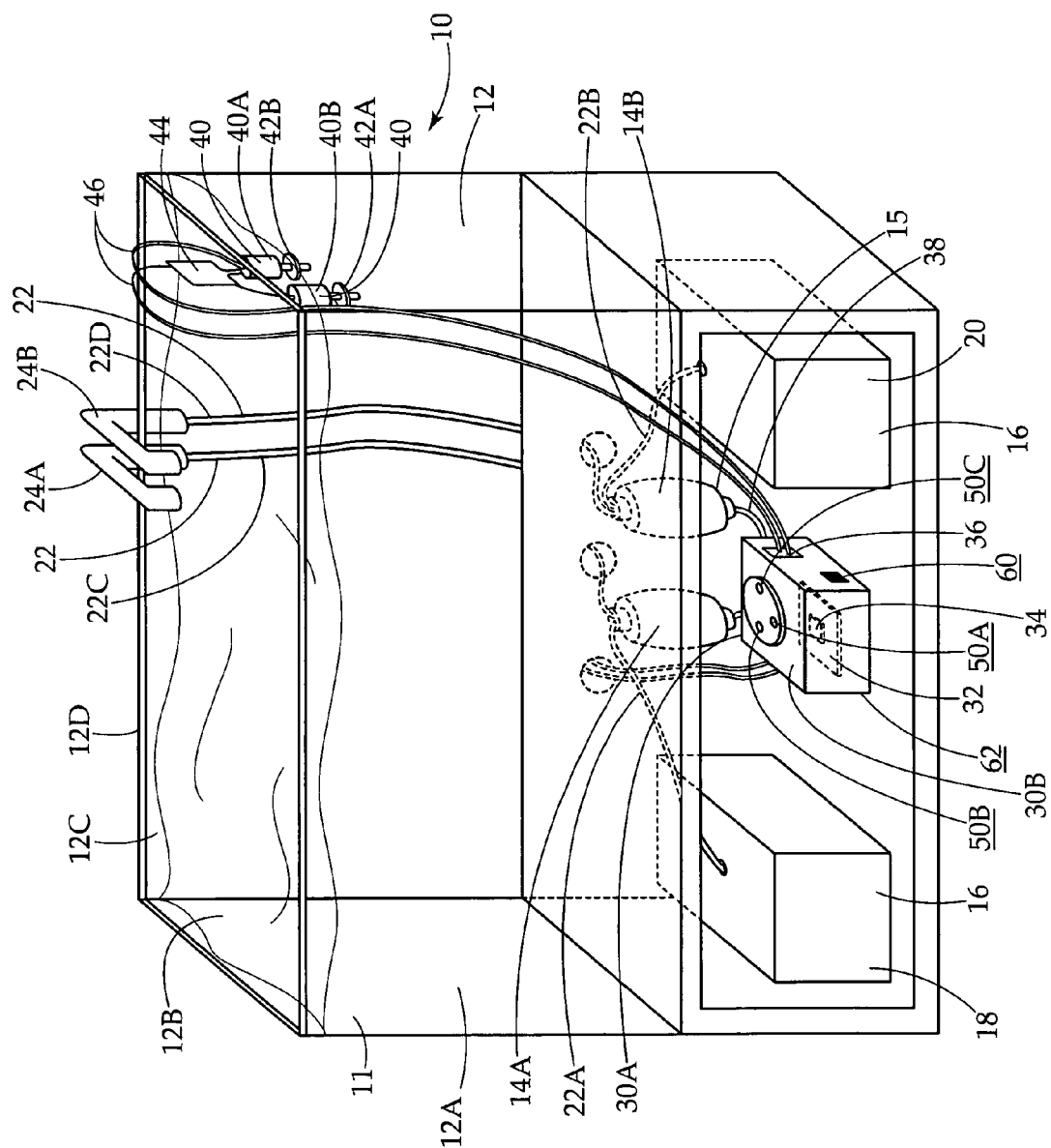
FIG. 1 is a diagrammatic perspective view of a water treatment system of the present invention equipped with dual pumps for automatically replenishing the water level within a marine reef aquarium by alternating between two treatment reservoirs.
Figure 4:
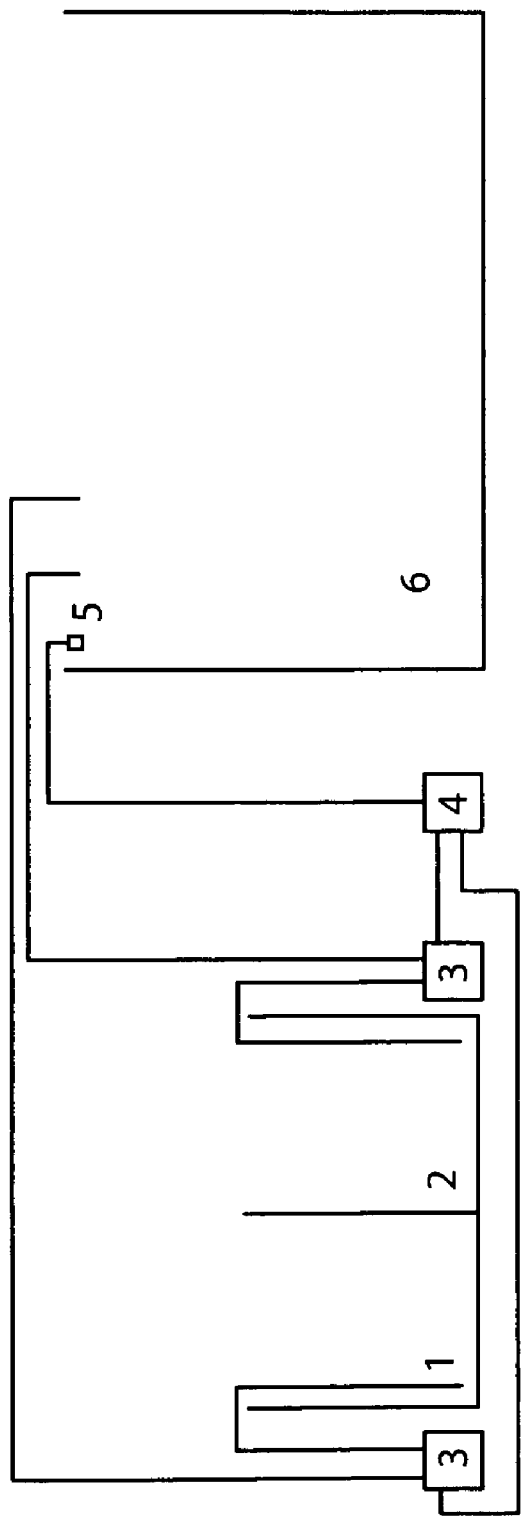
FIG. 4 is a schematic illustration for replenishing evaporated water in a marine reef aquarium using the dual pump water treatment system of the present invention.

FIGS. 1 and 4 illustrate a water treatment system 10 of the present invention for automatically replenishing the water level 11 within a marine reef aquarium 12 by alternating between two treatment reservoirs. To sustain the water level of the marine reef aquarium 12, the present invention includes dual pumps 14 which alternate to replenish the water level in the tank, while simultaneously maintaining the calcium and alkalinity balances. The marine reef aquarium 12 is a substantially rectangular glass tank 12A having an interior 12B filled with water for allowing stony corals and clams to grow therein. Preferably, the tank 12A includes an open top 12C for allowing easy access and a top edge 12D. The dual pumps 14 specifically include a first water pump 14A and a second water pump 14B.

The system 10 includes a pair of substantially rectangular reservoirs 16, and more specifically a calcium solution reservoir 18 and an alkalinity solution reservoir 20. The calcium solution reservoir 16 contains fresh reverse osmosis and deionized (RO/DI) water that is treated with a calcium supplement. In the preferred embodiment, illustrated in FIG. 1, the calcium solution reservoir 18 is stored beneath the marine reef aquarium 12.

The alkalinity solution reservoir 20 contains fresh RO/DI water that is treated with an alkalinity supplement. Preferably, the alkalinity solution reservoir 20 is housed below the marine reef aquarium 12.

A pair of pipes 22, including a first pipe 22A and a second pipe 22B connect the reservoirs 18 and 20 respectively to the first and second dual pumps 14A and 14B respectively. A second pair of pipes 22, including a third pipe 22C and a fourth pipe 22D, carry solution from the first and second dual pumps 14A and 14B into the interior 12B of the marine reef aquarium tank 12A but stop short before touching the water level. The pipes 22 are tubing that run from the reservoirs to the pumps and from the pumps to the aquarium. Various tubing materials known in the art can also be utilized to connect the reservoirs to the pumps and the pumps to the aquarium, including but not limited to, pvc pipe, flexible vinyl tubing, silicon tubing, or any other food safe tubing. A pair of pipe holders 24, including a first and second pipe holder 24A and 24B are attachable to the top edge 12D of the marine reef aquarium 12 and hold the third and fourth pipes 22C and 22D respectively, positioned downwardly and into the interior 12B of the tank 12A and stop short before touching the water level.

Figure 2:
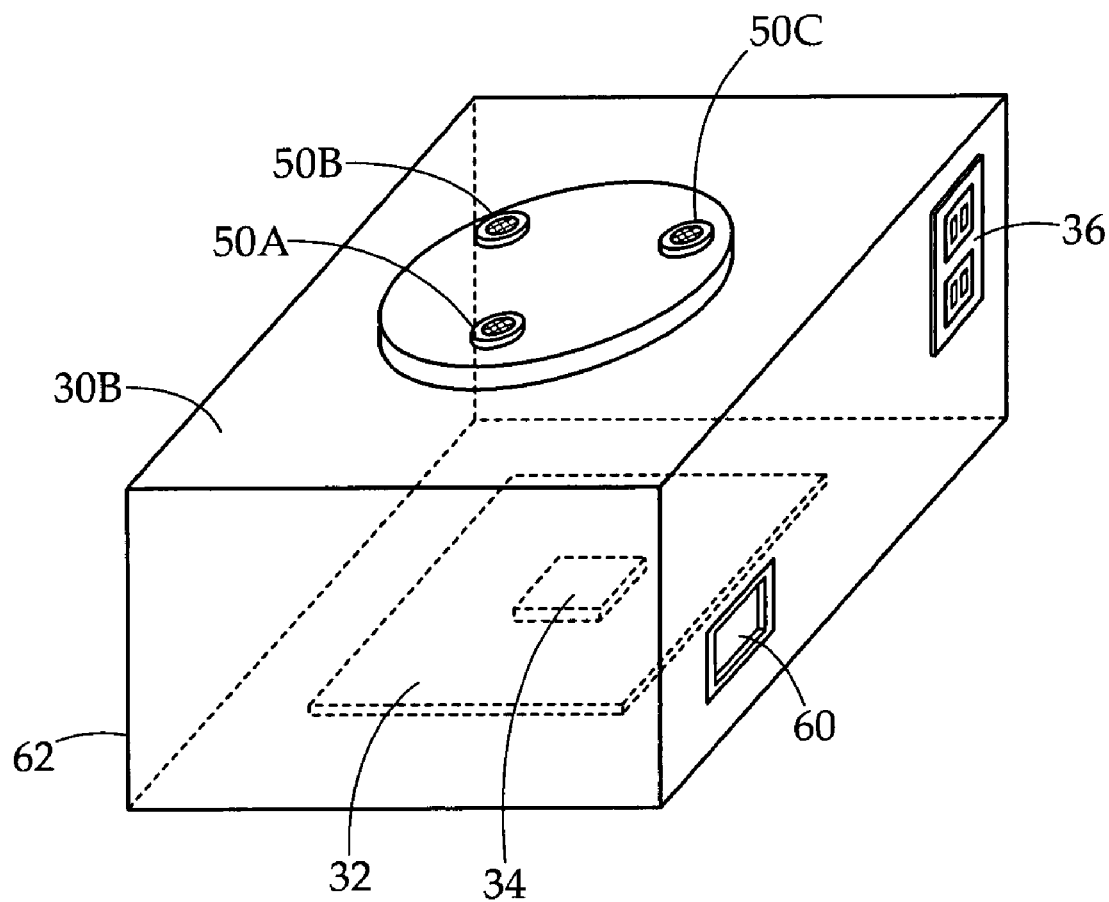
FIG. 2 is an exploded view of the switch box of the present invention for controlling the electrical circuitry.

FIG. 2 illustrates the components for controlling the electrical circuitry of the present invention. A switch box 30, preferably 2 inches by 4 inches by 3 inches and constructed of plastic material is positionable between the calcium solution reservoir 18 and the alkalinity solution reservoir 20. The switch box 30 includes a back end 30A. The switch box 30 contains components required for controlling electric circuitry of the system 10. In addition, the switch box 30 includes two alternating current (AC) power sockets 36 attachable on the back end 30A for delivering electrical power to the first and second water pumps 14A and 14B. The back end 30A also contains the AC power cord and wires 46 from a pair of water level sensors 40. The switch box 30 includes a top surface 30B having three apertures thereon for exposing three LED lights 50. The first LED light 50A indicates when the power is turned on, the second LED light 50B indicates when the calcium solution reservoir 18 is activated, and the third LED light 50C indicates when the alkalinity solution reservoir 20 is activated.

A printed circuit board 32, preferably 3 inches by 2.25 inches, is housed within the switch box 30 for transmitting electrical information throughout the system 10. A solid state relay 34 is mounted onto the printed circuit board 32 and allows the system 10 to alternate between pumping from the calcium solution reservoir 18 and the alkalinity solution reservoir 20. The solid state relay 34 is a solid state switch and could include micro controllers.

Referring to FIGS. 1-2, the first and second dual pumps 14A and 14B each have a bottom end 15. Each of the dual pumps 14 have an alternating current (AC) line cord 38 extending outwardly from the bottom end 15 of the pumps 14. Each AC line cords 38 has a two prong AC power plug 40 which plugs into one of the AC power sockets 36 of the switch box 30 for providing electricity to the pump 14. The first pump 14A is separately connected by the first pipe 22A to the calcium solution reservoir 18, while the second pump 14B is separately connected by the second pipe 22B to the alkalinity solution reservoir 20. When water levels in the tank 12A become low, water is carried from one of the two reservoirs 16 through the pipes 22 to replenish the tank 12A. The present system contemplates using submersible or external water pumps in alternate embodiments. In one alternate embodiment, the pipe 22 can extend to a pump connected to the aquarium 12.

Figure 3:
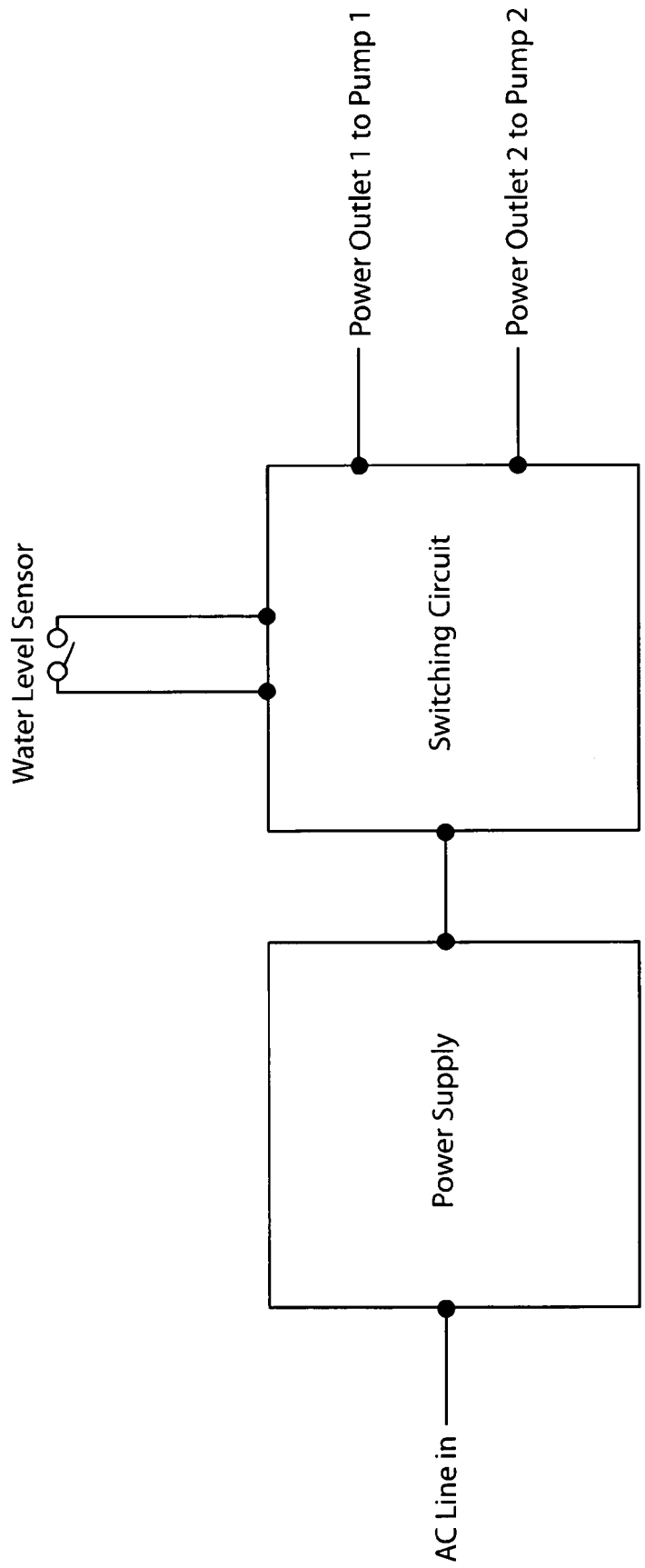
FIG. 3 is a schematic illustration of a block diagram describing the dual pump water treatment system for automatic top off.

This embodiment includes the pair of water level sensors 40 having two float switches 42 wired in series, mounted to a water level sensor holder 44 for detecting low water levels within the tank 12A. In other embodiments, the sensors 40 can include any combination of magnetic and mechanical float level sensors, pneumatic level sensors, conductive or electrode based level sensors, capacitance level sensors, optical interface point level sensors, ultrasonic sensors, microwave or radar level sensors, magnetostrictive level sensors, resistive chain level sensors, hydrostatic pressure level sensors, or air bubbler level measurement systems as a means for detecting water levels in the tank. This list is not exhaustive and other like sensors are contemplated. The switches 42, including a lower switch 42A mounted lower within the tank 12A and an upper switch 42B mounted higher within the tank 12B, control the level of the water within the tank 12A. If the lower switch 42A fails, the upper switch 42B shuts the system 10 off to avoid an overflow. The sensors 40 have a top end 40A which is electrically connected to the printed circuit board 32 and relay 34 within the switch box 30 by wires 46. The sensors 40 have bottom ends 40B which are submerged within the water of the tank 12A. As shown in FIG. 3, the solid state relay 34 is in communication with each pump 14, so that when the water level 11 of the tank 12A drops below a predetermined level due to evaporation, the water level sensors 40 trigger the relay 34, which actuates the power of the first pump 14A in connection with the calcium solution reservoir 18, to pump fresh water within said reservoir 18 into the tank 12A. When the water level sensor 40 detects the tank is full, preferably the lower switch 42A, the relay 34 turns the first water pump 14A off to prevent overflow. When the water level sensor 40, preferably the lower switch 42A, next detects a low water level 11 in the tank 12A, the sensor 40 triggers the relay 34 which actuates the power of the second pump 14B in connection with the alkalinity solution reservoir 20, to pump fresh water within said reservoir 20 into the tank 12B. When the water level sensors, preferably the lower switch 42A, detect that the tank 12A is full, the relay 34 turns the second pump 14B off to prevent overflow. The alternating replenishment of water from the calcium solution reservoir 18 and alkalinity solution reservoir 20 governed by the solid state relay 34 is repeated as needed according to the water level 11 of the tank 12A.

As shown in FIG. 1, the water level sensor holder 44 is preferably adjustable and constructed of transparent hard acrylic. The sensor holder 44 is securely mounted to the top edge 12D of the tank 12A and securely holds the water level sensors 40 therein, such that the top 40A of each sensor A power switch 60 is coupled to the switch box 30 for allowing the system 10 to be easily turned on and off. A standard power cord 62 powers the system 10 by allowing said system 10 to plug into a standard electrical wall outlet.

FIG. 3 is a schematic illustration of a block diagram describing the dual pump water treatment system for automatic top off. As shown, the AC line is connected to the power supply which is in communication with the solid state relay 34 of the printed circuit board 32 of the switch box 30. The water level sensors 40 are in communication with the solid state relay 34 of the printed circuit board 32 of the switch box 30. In addition, the switch box 30 is in separate communication with the power outlet for the first and second pumps 14A and 14B.

In conclusion, herein is presented a dual pump water treatment system for automatic top off. The invention is illustrated by example in the drawing figures, and throughout the written description. It should be understood that numerous variations are possible, while adhering to the inventive concept. Such variations are contemplated as being a part of the present invention.

What is claimed is:
1. A water treatment system comprising:
an aquarium having a glass tank having an interior filled with water, said tank having an open top and a top edge;
dual pumps including a first water pump and a second water pump alternating to replenish a water level in the tank and simultaneously maintaining calcium and alkalinity balances;
a pair of reservoirs including a calcium solution reservoir and an alkalinity solution reservoir, said calcium solution reservoir containing fresh reverse osmosis and de-ionized water treated with a calcium supplement, said alkalinity solution reservoir containing fresh reverse osmosis and de-ionized water treated with an alkalinity supplement;
a first pair of pipes including a first pipe and a second pipe, wherein said first pipe connects said calcium reservoirs to said first dual pump, and wherein said second pipe connects said alkalinity solution reservoir to said second pump;

a second pair of pipes including a third pipe and a fourth pipe, wherein said third pipe carries solution from said first pumps into said interior of said tank, and wherein said fourth pipe carries solution from said second pipe into said interior of said tank;

a pair of pipe holders including a first and second pipe holder attachable to said top edge of said aquarium, wherein said first pipe holder holds said third pipe positionable downwardly and into said interior of said tank, and wherein said second pipe holder holds said fourth pipe positionable downwardly and into said interior of said tank;

a switch box having a back end and a top surface and positionable between said calcium solution reservoir and said alkalinity solution reservoir, wherein said switch box having two alternating current power sockets attachable to said back end for delivering electrical power to said first and second water pumps separately, wherein said back end having an alternating current power cord and wires extending from said water level sensors, wherein said top surface having three apertures thereon;

three light emitting diodes including a first, second and third light emitting diode, one said diode extending upwardly through each said aperture, wherein said first light emitting diode indicating power, said second light emitting diode indicating activation of said calcium solution reservoir, and said third light emitting diode indicating activation of said alkalinity solution reservoir;

a printed circuit board housed within said switch box, having a solid state relay mounted thereon and in communication with each pump for alternating pumping from said calcium solution reservoir to said alkalinity solution reservoir;

wherein said first and second dual pumps each have a bottom end having an alternating current line cord extending outwardly therefrom, each alternating current line cord having a two prong alternating current power plug for plugging into one of said alternating current power sockets of said switch box, wherein said first pump is separately connected by said first pipe to said calcium solution reservoir, wherein said second pump is separately connected by said second pipe to said alkalinity solution reservoir;

a pair of water level sensors in communication with said solid state relay, said sensors having a top end electrically connected to said printed circuit board and relay within said switch box by said wires, said sensors having bottom ends submerged within said water of said tank, wherein said sensor holder is securely mounted to said top edge of said tank; and a power switch coupled to said switch box, and having a standard power cord for powering said system.

2. The water treatment system of claim 1 further comprising two float switches, including an upper and lower switch, wired in series mounted to an adjustable water level sensor holder for detecting low water levels within the tank, wherein the lower switch is mountable lower than the higher switch within the tank.

3. The water treatment system of claim 1 wherein the water level sensors are from the group consisting of liquid point level detection, continuous level monitoring, including magnetic and mechanical float level sensors, pneumatic level sensors, electrode based level sensors, capacitance level sensors, optical interface point level sensors, ultrasonic sensors, radar level sensors, magnetostrictive level sensors, resistive chain level sensors, hydrostatic pressure level sensors, and air bubbler level measurement systems.

4. The water treatment system of claim 1 wherein said aquarium is a marine reef aquarium.

5. The water treatment system of claim 1 wherein said calcium solution reservoir and alkalinity solution reservoir is stored beneath said aquarium.

6. The water treatment system of claim 1 wherein said first and second pumps are submersible.

7. The water treatment system of claim 1 wherein said first and second pumps are external water pumps.

8. A water treatment system for automatically replenishing a water level within an aquarium the steps comprising:
   i) providing the water treatment system of claim 1;
   ii) detecting a drop in water level below a predetermined level by said water level sensors;
   iii) triggering the relay to actuate the power of the first pump;
   iv) pumping fresh water from the calcium solution reservoir into the tank by the first pump;
   v) detecting a full tank by water level sensors and triggering the relay;
   vi) turning the first pump off;
   vii) detecting a drop in water level below a predetermined level by said water level sensors;
   viii) triggering the relay to actuate the power of the second pump;
   ix) pumping fresh water from the alkalinity solution reservoir into the tank by the second pump;
   x) detecting a full tank by water level sensors and triggering the relay; and
   xi) turning the second pump off.

9. The water treatment system of claim 8 for automatically replenishing a water level within an aquarium further comprising repeating steps ii) through xi).

10. A water treatment system for automatically replenishing a water level within an aquarium the steps comprising:
    i) providing the water treatment system of claim 1;
    ii) detecting a drop in water level below a predetermined level; and
    iii) replenishing water into the tank by alternating between said calcium solution reservoir to said alkalinity solution reservoir by said solid state relay.

* * * * *